(12) United States Patent
Gudmundsson

(10) Patent No.: US 6,388,209 B1
(45) Date of Patent: May 14, 2002

(54) METHOD TO AUTOMATICALLY AND ACCURATELY PORTION A SEQUENTIAL FLOW OF OBJECTS BY WEIGHT

(75) Inventor: Bjarni Gudmundsson, Isafjordur (IS)

(73) Assignee: Pols Electronics HF, Isafjordur (IS)

( * ) Notice: Subject to any disclaimer, the term of this patent is extended or adjusted under 35 U.S.C. 154(b) by 0 days.

(21) Appl. No.: 09/622,981

(22) PCT Filed: Nov. 18, 1998

(86) PCT No.: PCT/IS98/00010

§ 371 Date: Aug. 25, 2000

§ 102(e) Date: Aug. 25, 2000

(87) PCT Pub. No.: WO99/44759

PCT Pub. Date: Sep. 10, 1999

(30) Foreign Application Priority Data

Mar. 5, 1998 (IS) .................................................. 4682

(51) Int. Cl.$^7$ ........................ G01G 19/387; B07C 5/16
(52) U.S. Cl. .................................... 177/25.18; 209/596
(58) Field of Search ............................... 177/119, 145, 177/25.18, 103, 104; 209/596, 638, 592

(56) References Cited

U.S. PATENT DOCUMENTS

| | | | | |
|---|---|---|---|---|
| 4,223,751 A | * | 9/1980 | Ayers et al. ................. | 209/592 |
| 4,446,938 A | | 5/1984 | Kawanishi ................ | 177/25.18 |
| 4,483,047 A | | 11/1984 | Linville, Jr. ................. | 209/596 |
| 4,660,661 A | | 4/1987 | Yamano ................... | 177/25.18 |
| 4,821,820 A | * | 4/1989 | Edwards et al. .......... | 177/25.18 |
| 4,874,049 A | * | 10/1989 | Kee et al. .................... | 177/119 |
| 4,901,807 A | * | 2/1990 | Muskat et al. ........... | 177/25.18 |
| 5,178,227 A | * | 1/1993 | Kvisgaard et al. .......... | 177/145 |
| 5,319,160 A | * | 6/1994 | Nambu ..................... | 177/25.18 |
| 5,813,195 A | * | 9/1998 | Nielsen et al. ........... | 177/25.18 |
| 5,998,740 A | * | 12/1999 | Kvisgaard et al. ....... | 177/25.18 |

FOREIGN PATENT DOCUMENTS

| | | |
|---|---|---|
| DE | 4404897 | 8/1995 |
| GB | 2 116 732 | 9/1983 |
| WO | WO 95/25431 | 9/1995 |
| WO | WO 9608322 A1 | 3/1996 |

* cited by examiner

Primary Examiner—Randy W. Gibson
(74) Attorney, Agent, or Firm—Richard C. Litman

(57) ABSTRACT

The invention solves the problem of sufficiently accurately portioning by weight a sequential stream of objects with known individual weights, without having to return a considerable part of rejected excess objects to be processed again.

This is achieved by accumulating excessive objects into one or more holding areas where they will be used as the basis for subsequent portions, instead of being rejected and reprocessed.

This method makes it possible to use relatively simple and inexpensive equipment for sufficiently accurate portioning by weight in the fish and food processing industries, which requires highly complex and expensive equipment using existing technologies.

4 Claims, 1 Drawing Sheet

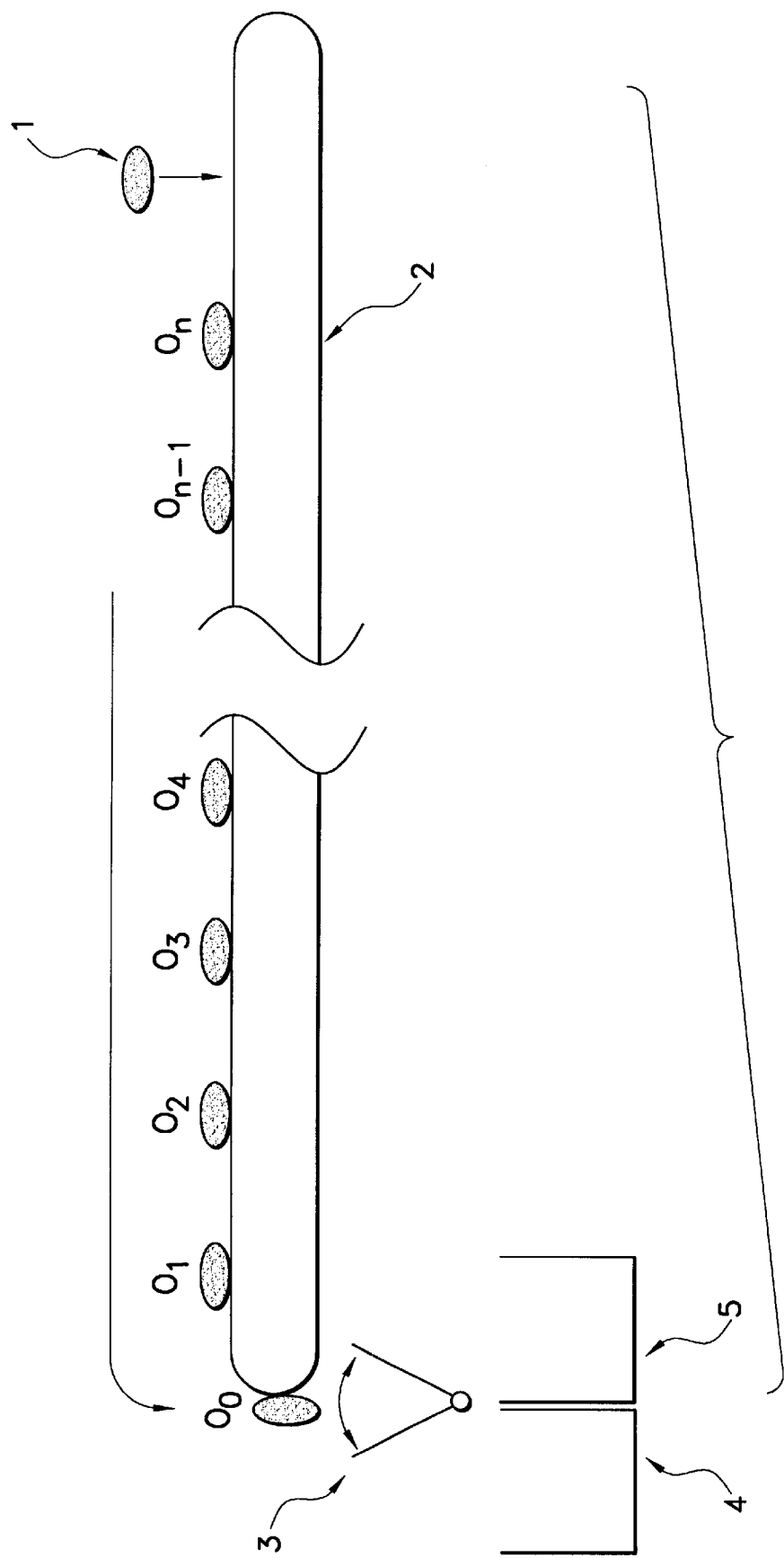

METHOD TO AUTOMATICALLY AND ACCURATELY PORTION A SEQUENTIAL FLOW OF OBJECTS BY WEIGHT

TECHNICAL FIELD

The invention relates to a method to automatically and accurately portion a sequential flow of objects by weight, using a limited number of simple conveyors and a simple routing mechanism.

Portioning by weight describes the process of selecting a combination of objects from a sequential stream or a fixed pool of objects of known individual weights, to obtain a combination of objects that together will make up a predefined total weight. The objective is to efficiently obtain a reasonably accurate final package weight without having to trim material off any of the objects, thus eliminating waste material.

BACKGROUND ART

A variety of methods to automatically portion by weight are in use today, mainly in the fish processing and food industries. They can be grouped into two main categories, listed here by order of increased accuracy:

1) Intelligent batching: A sequential stream of objects is accumulated into a number of holding bins, the objects being weighed and routed to selected bins one at a time. An attempt is made to optimize the bin selection process, usually based on a statistical model of the weight distribution of the infeed objects. The main advantage of this method is the relative simplicity of the equipment required for implementation and fair final Weight accuracy, while the main disadvantage is the requirements for controlled material infeed and inconsistent final weight accuracy.

2) Precise portioning: Objects are selected from a sufficiently large random-access pool of objects of known individual weights to ensure that a satisfactory combination of objects can be found. Random access relates to the ability of the equipment to route any object, or combination thereof, to an accumulation station for the final portion. The main advantage of this method is high and consistent final weight accuracy. The main disadvantages are the complexity of the equipment required for implementation and the requirement for complex and controlled material infeed to fill the vacated object pool positions.

Random access to a large pool of individual objects with known weights has been a requirement for precise portioning, but the random access requirement has only been achieved using relatively complex equipment. Sequential access to such a pool of objects requires only simple equipment for implementation (a conveyor), but an inherent problem with sequential access is how to dispose of objects in the sequence that have not been selected for a portion combination. Usually such objects have to be rejected or recirculated back to the infeed stream.

Patents have been issued for three precise Portioning by Weight methods (DE 44 04 897 A1, U.S. Pat. No. 4,446,938 and U.S. Pat. No. 4,660,661) but they are all based on a random access to objects. The invention described here, on the other hand, is based on a sequential access to objects with known weights.

Two patent applications are known that relate to methods for batching a sequential stream of objects into batches with a predetermined weight with reasonable accuracy. Application GB 2116732A relates to the use of statistical methods, based on a normal weight distribution among the objects to optimize the selection process. A disadvantage of this invention is the fact that objects of an unsuitable weight that cannot be used as part of a portion when they happen to pass through the selection process, have to be rejected or recirculated back to the input stream. Application WO 9608322A1 relies on identical harware and also uses statistical methods to optimize the selection process. Unsuitable objects also have to be rejected or recirculated, but novely is claimed for the use of the actual weight distribution which refines the selection process and negates the problem of having an input stream of objects that does not have a normal weight distribution, e.g. due to prior removal of objects more suitable for other processing.

DISCLOSURE OF INVENTION

The objective of the invention is to automatically achieve satisfactory portioning accuracy using a strictly sequential access to a pool of individual objects with known weights, requiring only simple equipment for implementation. The invention, called Flow Portioning, is based on a unique method of disposing of objects in the sequence that are not part of the pending portion, by using them as a part of subsequent portions to be processed.

One implementation of the equipment according to the invention is to use a long conveyor to hold and transport a pool of objects with known weights towards a selection station. The length of the conveyor is determined only by the size of the pool required to achieve a satisfactory combination of objects for precise portioning.

Another implementation of the equipment according to the invention is to use two or more synchronized conveyors, mounted and driven in parallel, to increase throughput and reduce the length of the equipment. In this implementation, each conveyor will have an individually actuated selection station, but portion accumulation stations in common with the other conveyors.

BRIEF DESCRIPTION OF DRAWINGS

Only one drawing is supplied (FIG. 1), which shows the various key components.

MODE FOR CARRYING OUT THE INVENTION

This section describes the invention with reference to the supplied drawing (FIG. 1). In the implementation illustrated, a single paddle is used to route each object into one of two possible portion accumulation locations. Other implementations can use two paddles to route objects to three locations, and still other implementations can use three paddles to route objects to four locations. The number of portion accumulation locations will be determined by the requirements of each application. Conveyors can also be used to remove completed portions in place of the bins illustrated.

Objects (1) with a known weight are placed on the infeed end of the conveyor (2), using any one of a number of existing methods of automatic pieceweighing. A microprocessor system keeps track of each object ($O_o$–$O_n$) and it's location in the sequence. When an object ($O_o$) is transported off the output end of the conveyor, the selection paddle (3), controlled by the microprocessor system, will direct the object into one of the two portion accumulation locations or bins, (4) or (5). One of the bins is designated the "current bin" and will receive the objects selected to form the desired target weight combination, while the other bin is designated as the "pending bin".

In an example where objects are being selected to form a portion with the desired target weight (W). where each portion cannot be lighter that W and the objective is to select a combination of objects that will result in the lowest portion overweight possible. The actual final weight ($W_R$) must therefore be equal to or greater that W. In the example. bin (4) has the role of the "current bin", object $O_o$ falling off the conveyor end is the final object previously selected to form the portion in that bin, and the system microcontroller actuates the paddle accordingly. At this moment in time the "pending bin" (5) contains the weight WF which is less than W. Also. it must be true that $$WF \leq WF_{MAX} < W$$

where $WF_{MAX}$ is a weight limit determined before the process was initiated.

When a portion has been filled in the "current bin", the following sequence of events is initiated:

The "current bin" (4) is emptied.

The bins will switch roles. In the example bin (5) becomes the "current bin" and bin (4) becomes the "pending bin".

The microcontroller selects the objects to add to WF already in bin (5).

The objective is to select a combination of objects (O) that has the smallest total weight for the condition $$Comb(O) + WF \leq W$$

where WF is the weight of the objects already accumulated in bin (5) and Comb(O) is the combined weight of the objects selected from the pool available on the conveyor.

The selection is limited to the range of objects $O_I$ to $O_k$, where k<n and it must also be true for k that $$WF' \leq WF_{MAX}$$

where WF' is maximum combined weight of the excess objects that can be directed to the "pending bin" (4). The selected combination will be the best available that meets both the condition that $W<W_R$ and that $WF' \leq WF_{MAX}$. The condition $WF' \leq WF_{MAX}$ will ensure that the "pending bin" will never overfill.

The combination selection process will only take a fraction of a second, consists mainly in designating a destination for each object in the range $O_I$ to $O_k$. Simply letting the conveyor run and directing each object to the designated bin, using the paddle (3), will spend most of the elapsed time.

Every time a portion is filled this process is repeated.

What is claimed is:

1. A method of automatically and precisely portioning a sequential stream of objects with individually known weights, without having to reject excess objects in the sequence that have not been selected for the portion being accumulated, wherein the improvement comprises using the excess objects to form the basis of subsequent portions.

2. A method according to claim 1, wherein the improvement comprises ensuring the combined weight of the excess objects forming the basis for a subsequent portion will never be excessive by allowing some portion overweight, while keeping the overweight as low as possible.

3. A method according to claim 1, which is wherein the improvement comprises automatically and precisely portioning more than one sequential stream of objects with known weights where a separate set of selection paddles is assigned to each stream, but the portion accumulation locations are common for all the streams.

4. A method according to claim 2, wherein the improvement comprises automatically and precisely portioning more than one sequential stream of objects with known weights where a separate set of selection paddles is assigned to each stream, but the portion accumulation locations are common for all the streams.

* * * * *